No. 797,073. PATENTED AUG. 15, 1905.
J. C. PERRY.
MECHANISM FOR DISTRIBUTING ENSILAGE IN SILOS.
APPLICATION FILED SEPT. 4, 1903.
2 SHEETS—SHEET 1.
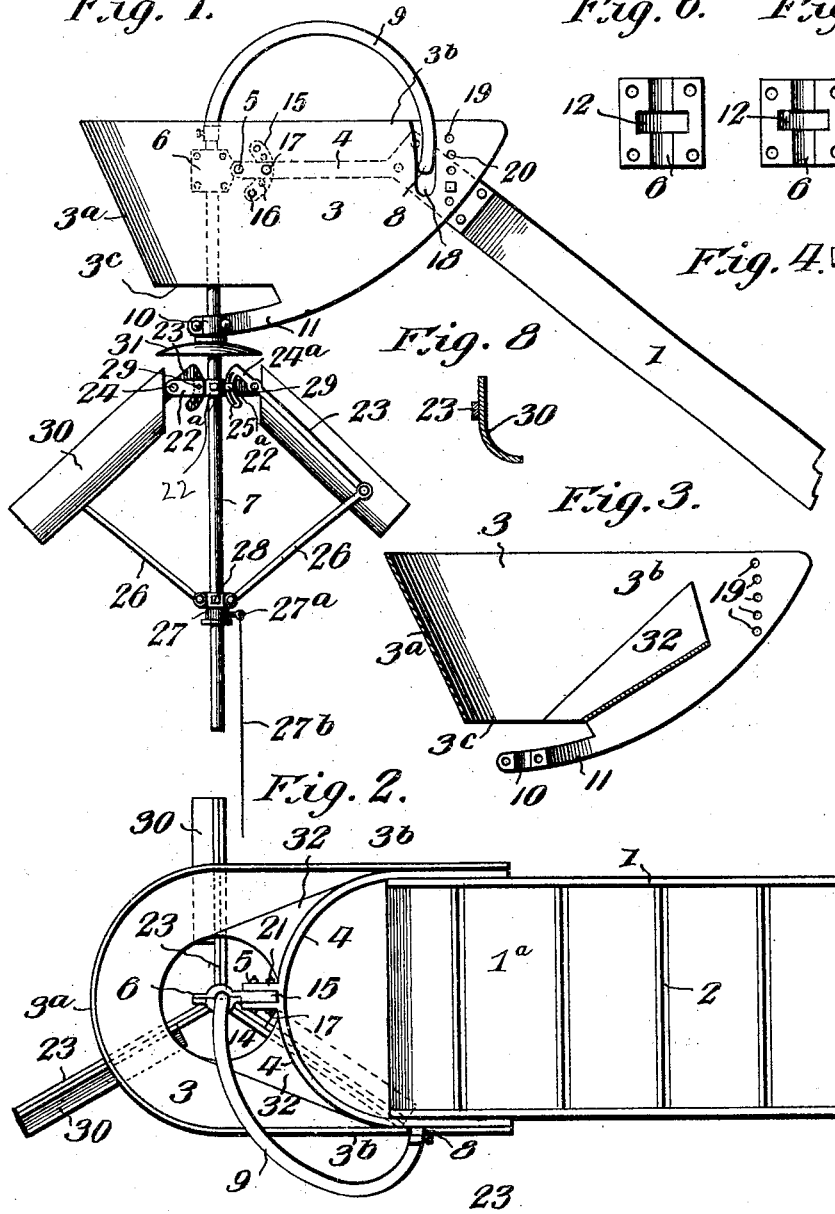

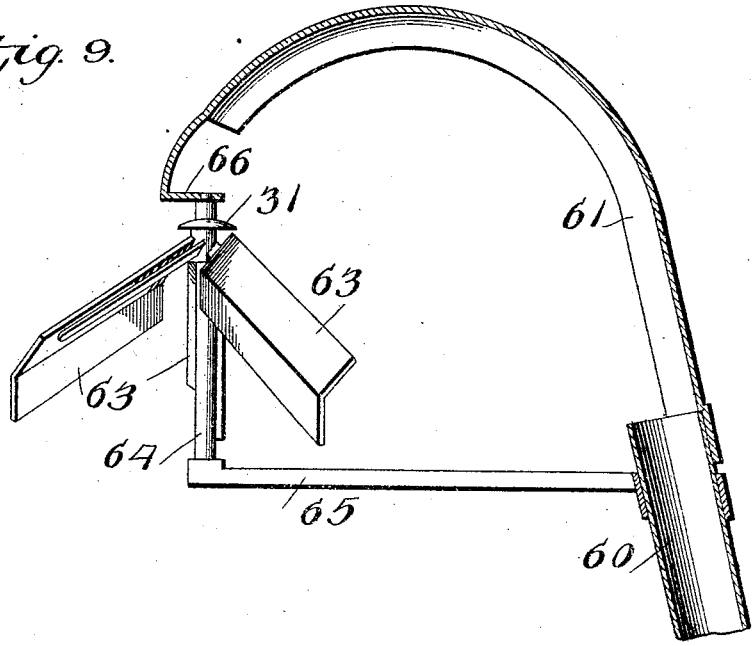
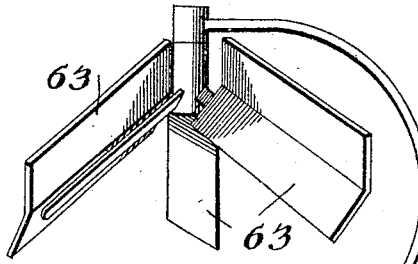
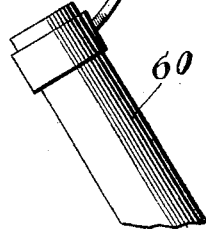

UNITED STATES PATENT OFFICE.

JOHN COLE PERRY, OF COLUMBIA STATION, OHIO.

MECHANISM FOR DISTRIBUTING ENSILAGE IN SILOS.

No. 797,073.     Specification of Letters Patent.     Patented Aug. 15, 1905.

Application filed September 4, 1903. Serial No. 172,030.

*To all whom it may concern:*

Be it known that I, JOHN COLE PERRY, a citizen of the United States, residing at Columbia Station, in the county of Lorain and State of Ohio, have invented new and useful Improvements in Mechanism for Distributing Ensilage in Silos, of which the following is a specification.

This invention relates to an improved apparatus for distributing ensilage as it enters a silo or other air-tight structure within which ensilage and other substances are to be preserved for a greater or less period of time.

The mechanism consists generally of an elevating means extending from or near the ground to the top of a silo, where it enters a hopper-shaped receptacle or trough of suitable formation for the purpose intended, which receptacle receives the material carried up by the elevating mechanism. Beneath the hopper-shaped receptacle or trough and mounted on a vertical shaft extending into said hopper is a series of distributing-blades, which as the shaft is rotated strike the ensilage or other material as it falls through the open bottom of the receptacle and distribute it evenly within the silo, at the same time breaking up all lumps and entangled portions that may have been formed.

My apparatus is also designed to fill two or more silos by means of a single distributing mechanism adapted to swing about a central point.

In the accompanying drawings, Figure 1 is a side elevation of my invention with a portion of an elevator attached thereto. Fig. 2 is a top plan view of the same. Fig. 3 is a vertical sectional view through the hopper into which the material is fed. Fig. 4 is an elevation of the vertical shaft which projects upwardly into the hopper and to which the distributing-blades are attached. Figs. 5 and 6 are views of the two parts of the bearing for the upper end of the vertical shaft. Fig. 7 is a perspective view of one of the distributing-blades. Fig. 8 is a cross-sectional view of the aforesaid blade. Fig. 9 is an elevation, partly in section, showing a pneumatic feeding mechanism for the ensilage. Fig. 10 represents a view in elevation of a pneumatic feed differing somewhat from Fig. 9. Fig. 11 is a view in cross-section of one of the distributing-blades used in connection with the apparatus shown in Fig. 9. Fig. 12 is a cross-sectional view of one of the blades applied to the apparatus illustrated by Fig. 10.

Similar numerals of reference indicate corresponding parts throughout the several views.

The numeral 1 indicates an elevator of well-known form and construction, having a chain, canvas, or other belt $1^a$ with cross-strips 2 secured thereon, adapted to be placed in an inclined position with its upper end extending into the receptacle 3. A curved plate or hanger 4 is bolted to the elevator within the hopper. Inwardly-projecting fingers 21 on said curved plate are pivoted at 5 to a bearing 6, in which a vertical shaft 7 rotates.

The numeral 8 indicates a shaft on which is mounted a drum around which the elevating-belt passes. From one end of the shaft 8 a flexible shaft 9 is attached, which extends to and is connected with the upper end of the aforesaid shaft 7.

It will be understood from the above that when the elevator is in operation motion will be conveyed from the shaft 8 through the flexible shaft 9 to the vertical shaft 7.

The receptacle or trough 3 is substantially U-shaped in plan view, having a curved inner end $3^a$ and parallel sides $3^b$, the curved end having a downward inclination toward the outlet $3^c$. Within the receptacle and between the sides $3^b$ thereof is placed a dished plate 32, having a downward inclination toward the outlet $3^c$. One end of the drum-carrying shaft 8 passes through one side of the receptacle 3, which is slotted at 18 to enable the receptacle to swing freely without interference from said shaft. At the lower end of the receptacle 3, but separated a short distance therefrom, is a second bearing 10 for the shaft 7, which bearing is formed on an arm 11, integral with or attached to the receptacle. The upper bearing 6 of the shaft 7 (shown in detail in Figs. 5 and 6) has a circular recess 12 formed therein for a collar 13 on said shaft to prevent it from dropping out of said bearing. On one section of the bearing 6 is an arm 14, to which the fingers 21 of the hanger 4 are pivoted, while at the outer end of said arm is a curved plate 15, through which a series of openings is made.

Keyed or otherwise attached to the vertical shaft 7 a short distance below the bearing 10 is a spider 22, here shown with three arms 22ª. This number may, if desired, be increased or diminished at will. Pivoted to the outer end of each arm 22ª is a rod 23, the longer end of which extends downwardly and outwardly when in operative position, while its upper end reaches beyond its pivot 24ª and is provided with a curved slotted segment 25. A brace-rod 26, pivoted to the lower end of the rod 23, extends inwardly toward the shaft 7, where it is journaled to a runner 27, through which a bolt 28 passes for the purpose of securing it to the shaft. Bolts 29 pass through the slots in the segment 25 and into the arms of the spider 22, so that when they are tightened the segment 25 will be held fast to said arm. Secured to each arm 23 and parallel thereto is a distributing-plate 30, its lower edge being curved in the direction of rotation of the shaft 7. (See Fig. 8.) Mounted on the shaft just below the bearing 10 is a curved disk 31 of sufficient size to extend beyond the arms of the spider 22 to prevent ensilage from dropping on the pivots 24 and bolts 29. A swivel 27ª is attached to the bottom of the runner 27, from which a rope 27ᵇ falls to the bottom of the silo and is secured by any suitable means.

The operation of my device is as follows: The receptacle 3 is secured within a silo by braces or suitable means in such position that the shaft 7 will be in the center of the silo, or approximately so, while the elevator 1 extends from the ground upwardly in inclined direction to the receptacle. Ensilage or other material to be preserved when placed on the belt 1ª and the latter caused to rotate will be raised to the top of the machine and dropped upon the inclined plate 32 within the receptacle, from whence it falls by gravity to and through the openings 3ᶜ in the bottom of the receptacle, through which the shaft 7 passes. The movement of the belt will of course rotate the drum carried by the shaft 8 at the upper end of the elevator. Said shaft 8 through the flexible shaft 9 rotates the vertical shaft 7, carrying the distributing-blades 30. As the material passes through the receptacle-outlet it drops on the convex surface of the disk 31, from which it falls, and also into the plane of rotation of the blades 30. The latter striking the material throws it outwardly and downwardly, breaking up all lumps and entangled portions and thoroughly distributing the material with great uniformity. The curved lower edges of the blades tend to support the ensilage and prevent it from falling between the blades to the center of the silo. The angular position of the blades may be increased or decreased, in order to spread the material over a greater or less extent, by loosening the bolt 28 and raising the runner 27 to increase the area of distribution or lower said runner when the surface to be covered is not so great. It is preferred, however, to change the position of the blades by means of the rope 27ᵇ, depending from the swivel 27ª into the silo. If the bolt 28 be loosened, the blades 30 will when rotated be carried outwardly by centrifugal force. Now by pulling the rope 27ᵇ from within the silo the blades will be lowered. Thus it will be seen that the proper angle of the blades is at all times in the control of a person in the silo. When the blades are correctly set, the rope is secured. An optional means for spreading the distributing-blades is by the use of the slotted segment 25 and bolts 29.

Silos, as is well known, are built in a number of sizes both as to diameter and height. One aim of this invention not heretofore mentioned is to provide an apparatus for raising and distributing ensilage and filling a silo whatever its diameter or height may be. The means for distributing ensilage within silos of different diameters has heretofore been described; but to adapt the apparatus for use with different heights of silos will now be explained.

The elevator 1 is preferably made of a predetermined length and, as previously stated, is pivoted by the fingers of its hanger 4 to the bearing 6. If the apparatus is to be applied to a low silo, the pin 17 is or may be first withdrawn from the holes in the fingers 21 and in the plate 15 and the apparatus raised and secured in the silo. The lower end of the elevator is afterward moved to the position where it will receive the material to be raised and the locking-pin 17 replaced. After filling the silo and another but taller one is to be filled the apparatus is taken down, carried to the empty silo, and again raised and secured and the elevator adjusted.

It will be seen from the above description that when the apparatus is applied to a high silo the elevator being of constant length will stand in a more upright position than when the apparatus is used with a shorter silo. By having the elevator pivoted to the remaining portion of the apparatus the shaft 7 will always stand in vertical position, whatever the angle of the elevator.

Fig. 9 illustrates one form of a pneumatic device for feeding ensilage. As there shown, 60 indicates a pipe through which ensilage is forced upward by a blast of air from a blowing-engine or other mechanism for producing a current of air. Attached to the upper end of the tube 60 is a trough-shaped semicircular guide 61, opening inwardly, which directs the ensilage and air-blast toward the upper end of a vertical shaft 64, at which point the ensilage falls on the distributing arms or blades 63, mounted upon the shaft 64 and adapted to turn in bearings 65 and 66. The arms or blades 63 are made in the form shown in Fig. 11—that is to say, with an upper inclined portion and a lower vertical portion. The air-blast following the guide 61 impinges on the inclined portion of the arms or blades 63 and causes them to rotate, while the vertical portions of said blades strike the ensilage and distribute it.

Fig. 10 illustrates another form of apparatus for raising or elevating the ensilage by means of a pressure of air. In this case the compressed-air tube has its outlet below the distributing-blades, which latter are of the shape shown in Fig. 12, where it will be seen that the under portion of the blades are inclined while the upper half is vertically disposed. The full blast of air or the greater part thereof will strike the blades and cause them to rotate, the ensilage being carried past them into the path of the vertical portions of the blades and be distributed by them.

Having thus described the invention, what is claimed is—

1. In an apparatus of the character described, an elevator, a rotatable shaft, blades on said shaft and rotatable therewith, means for varying the angle of inclination of the blades relative to the shaft and means for rotating said shaft, whereby material raised by said elevator is delivered against said blades and distributed.

2. In an apparatus of the character described, a feeder, a rotary distributer having distributing-blades, and means for varying the working position of the blades by centrifugal force and gravity.

3. In an apparatus of the character described, a feeder, a rotary distributer having pivoted distributing-blades, means for normally maintaining the blades in working position, and means for varying the working position of the blades by centrifugal force and gravity.

4. In an apparatus of the character described, elevating means for raising ensilage to the top of a structure, a receptacle for said raised material having an outlet, a vertical shaft, means for driving said vertical shaft by the operation of the elevator, a spider on said vertical shaft, blades pivoted to said spider, and means for controlling the angular position of said blades.

5. In an apparatus of the character described, an elevator for raising ensilage to the top of a structure, a receptacle for said ensilage having an outlet, a vertical shaft extending through said opening into said receptacle, a bearing for supporting said shaft and pivotally connected to said elevator, distributing-blades on said vertical shaft below the receptacle, and a flexible driving mechanism between said vertical shaft and said elevator.

6. An apparatus of the character described, having a rotatable vertical shaft, a spider attached thereto, distributing-blades pivoted to said spider, a runner on said vertical shaft pivotally connected by brace-rods to said distributing-blades, and means connected to said runner and extending below the same for regulating the angular position of said blades.

7. An apparatus of the character described, having a rotatable vertical shaft, a spider attached thereto, distributing-blades pivoted to said spider, a runner on said vertical shaft, pivoted brace-rods between said spider and said distributing-blades, a swiveled connection on said spider, and a rope or its equivalent connected to said swivel and extending below the same.

8. An apparatus of the character described, having rotatable distributer-blades, a spider, rods pivoted thereto, to the lower end of each of which a distributer-blade is attached, its upper end carrying a slotted segment, and means for temporarily securing said segments to the spider.

9. In an apparatus of the character described, an elevator, a receptacle for receiving the contents of said elevator and having an outlet, a vertical shaft below said receptacle and extending thereinto through said outlet, a distributing device on said shaft below said elevator, a bearing for the upper end of said shaft pivotally connected to said elevator, and locking means for connecting the elevator to the bearing and to the receptacle, the parts being so arranged that the angle between the elevator and the vertical shaft may be changed at will and held in said changed position.

10. In a machine of the character described, an elevator for conveying material to be distributed to an elevated point, a hopper at the elevated point adapted to receive the material from the upper end of the elevator, means for pivotally mounting the upper end of the elevator whereby the working position of the same may be changed to deliver the material at a greater or less elevation, and a rotary distributer adapted to distribute the material distributed from the hopper, said distributer being adjustable to work at different elevations.

11. In a machine of the character described, the combination of an elevator, a vertical rotary shaft, a hopper for receiving the material delivered by the elevator, distributing-blades carried by said rotary shaft below the outlet of the hopper, and a deflector between said outlet and blades.

12. In a machine of the character described, an elevator, a hopper for receiving the material delivered by the elevator, a vertical rotary shaft, distributing-blades on the shaft below the outlet of the hopper, means for raising and lowering said blades on the shaft to act at different elevations, and means for correspondingly varying the working position of the elevator.

13. In a machine of the character described, an elevator for delivering material to an elevated point, a hopper at the elevated point adapted to receive material delivered by the elevator, a vertical rotary shaft, means for pivotally mounting the upper end of the elevator to change its working position, distributing-blades pivotally mounted on the rotary shaft below the outlet, and means for changing the position of said blades to work at different elevations and at different angles to the shaft.

In testimony whereof I have signed my name to this specification in the presence of two subscribing witnesses.

JOHN COLE PERRY.

Witnesses:
    ALICE R. N. ADAMS,
    C. B. ADAMS.